Feb. 7, 1956 A. N. REICHEL 2,734,107
FLOW ACTUATED DEVICES
Filed July 16, 1953 2 Sheets-Sheet 1
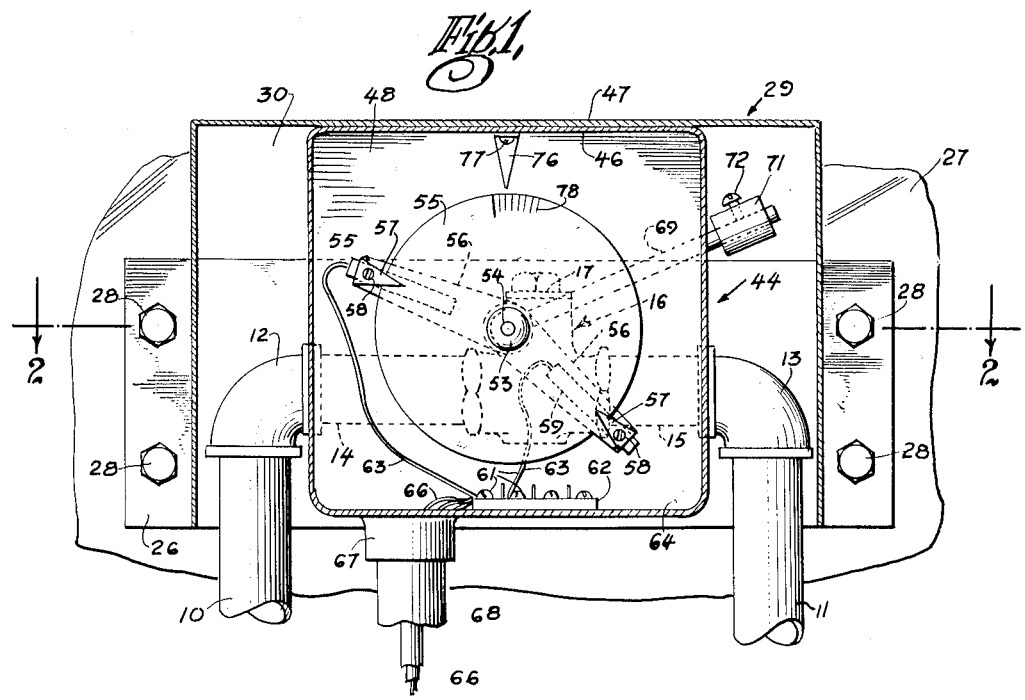
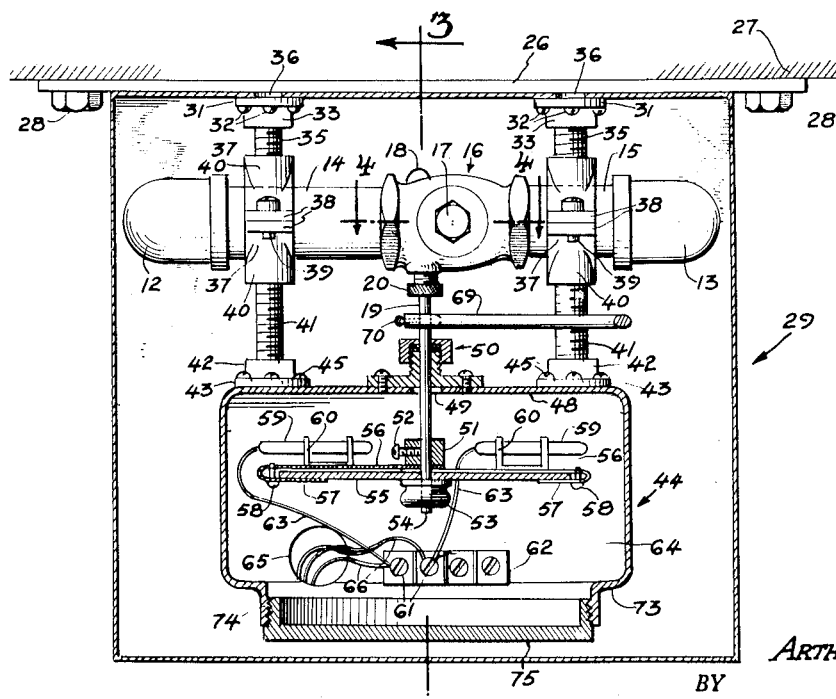
INVENTOR.
ARTHUR N. REICHEL
BY
Moses, Nolte, Crews & Berry
ATTORNEYS Feb. 7, 1956     A. N. REICHEL     2,734,107
FLOW ACTUATED DEVICES
Filed July 16, 1953          2 Sheets—Sheet 2
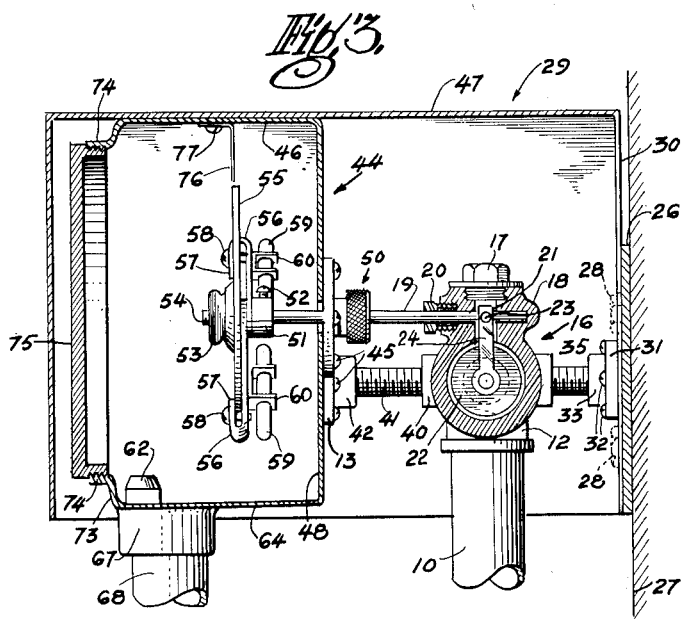
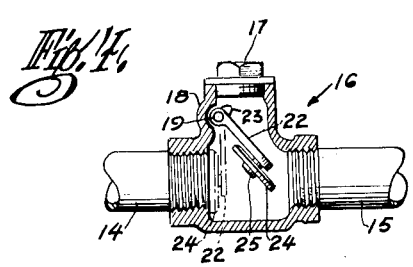
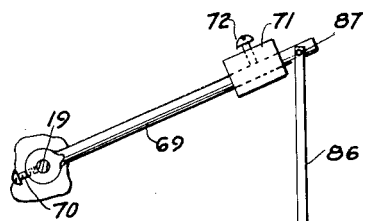
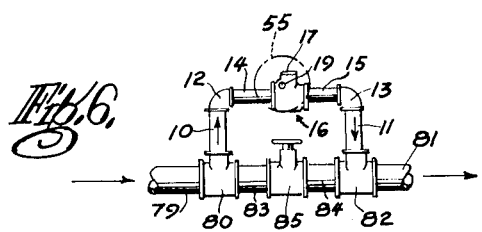
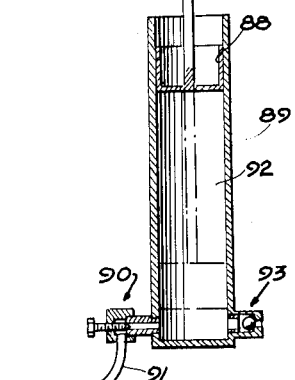
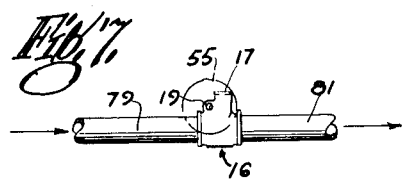
INVENTOR.
ARTHUR N. REICHEL
BY
Moses, Nolte, Crews & Berry
ATTORNEYS United States Patent Office 2,734,107
Patented Feb. 7, 1956

2,734,107

FLOW ACTUATED DEVICES

Arthur N. Reichel, Tenafly, N. J.

Application July 16, 1953, Serial No. 368,433

10 Claims. (Cl. 200—81.9)

This invention relates to automatic controls for electrical devices.

It is an object of the present invention to provide an automatic control for electrical devices which is actuated by the flow of a liquid, vapor or gas through a pipe.

It is another object of the present invention to provide a control for electrical devices of the above type which may also be utilized as an indicator for determining the rate of flow of the liquid, vapor or gas through the pipe.

It is another object of the present invention to provide a control for electrical devices of the above type which will automatically stop a pump after the liquid which it pumps has ceased to flow through the pipe.

It is another object of the present invention to provide a control for electrical devices of the above type which includes a plurality of mercury switches set at predetermined positions and adapted to actuate motors or starters so that additional pumps may be connected into the system in accordance with changes in the rate of flow of the liquid, vapor or gas through the pipe.

Other objects of the present invention are to provide a control for electrical devices bearing the above objects in mind which is of simple construction, inexpensive to manufacture, has a minimum number of parts, is easy to use and is efficient in operation.

For other objects and a better understanding of the invention, reference may be had to the following detailed description taken in connection with the accompanying drawing, in which:

Figure 1 is a front elevational view of a control for electrical devices embodying the features of the present invention with the inner and outer casings shown in section;

Figure 2 is a transverse sectional view taken along the line 2—2 of Fig. 1;

Figure 3 is a vertical sectional view taken along the line 3—3 of Fig. 2;

Figure 4 is a vertical sectional view taken along the line 4—4 of Fig. 2;

Figure 5 is a fragmentary side elevational view of a portion of the device showing the connection thereto of an optional time delay mechanism;

Fig. 6 is a diagrammatic view showing one manner of installation of the control and Fig. 7 is a diagrammatic view showing another manner of installation of the control..

In general, the invention consists in providing a control for electrical devices including a plurality of adjustably mounted mercury switches connected in series with the devices to be controlled, the device being actuated by the flow through a vessel of a liquid, vapor or gas or by a portion of said flow. The same mechanism which operates the aforesaid switches may instead be utilized for indicating the rate of flow of the liquid, gas or vapor through the vessel, or, preferably, both the indicating and control features may be embodied in simultaneous operation.

Referring now more in detail to the drawing, in which similar reference numerals identify corresponding parts throughout the several views, there are shown a pair of vertical pipes 10 and 11 provided at their upper ends with pipe elbows 12 and 13, respectively. A horizontal length of pipe 14 is connected to elbow 12, while a second horizontal length of pipe 15 is connected to the elbow 13.

The ends of pipes 14 and 15 remote from elbows 12 and 13 are externally threaded and are connected by a pipe T 16, the upper end of the T 16 being closed by a pipe plug 17. The upper portion of T 16 at one side is reinforced, as at 18, and serves to rotatably mount an elongated, laterally extending shaft 19. A packing gland 20 is provided in the side of T 16 and rotatably receives the shaft 19 therethrough (Fig. 3).

The reinforced portion 18 of the T 16 is provided with a central vertical opening 21 to accommodate a downwardly extending swinging arm 22, the upper end of the swinging arm 22 being enlarged and having an opening receiving the shaft 19 therethrough. The swinging arm 22 is locked to the shaft 19 by means of a set screw 23. The lower end of the swinging arm 22 is similarly enlarged and provided with an opening, and is connected to a circular flapper or plate 24 by means of a rivet 25 or the like. As shown in dotted outline in Fig. 4, the flapper 24 will normally close the end of pipe 14 when in an at rest, substantially vertical position (until moved away or rotated upwardly under the action of a fluid flowing from pipe 14 to pipe 15).

A rectangular mounting plate 26 is secured to a wall 27 at each end by means of bolts 28.

A rectangular housing 29, open at the bottom, is secured along its rear wall 30 to the plate 26 by means of circular flanges 31 and bolts 32, the bolts 32 passing through aligned openings in plate 26, wall 30 and flanges 31.

The flanges 31 are integrally formed with hubs 33, each of the flanges 31 and hubs 33 being provided with an internally threaded bore which receives an externally threaded stud 35. The rear wall 30 is provided with a pair of openings 36 adapted to receive the ends of the studs 35 when the latter are in one extreme position.

Two cooperating pairs of semi-circular brackets 37 are provided on each of the pipes 14 and 15 each in lateral alignment with the studs 35, the semi-circular brackets 37 being integrally formed at their ends with cooperating flanges 38 secured to each other by bolts 39, as will be obvious.

The brackets 37 at their central vertical portions on each side are integrally formed with outwardly extending, internally threaded hubs 40, the hubs 40 adjacent the back wall 30 having screwed therein the forward portions of the adjustable studs 35.

The hubs 40 remote from the rear wall 30 are provided with externally threaded studs 41 which extend forwardly parallel to the elongated shaft 19 and have in turn screwed on their ends internally threaded hubs 42 integrally formed with flanges 43.

The flanges 43 are secured to the rear wall 48 of an explosion-proof housing 44 by means of bolts 45.

The rear wall 48 of explosion-proof housing 44 is provided with a central opening 49 through which the elongated shaft 19 extends forwardly, an explosion-proof gland 50 being secured to the rear face of the wall 48 and receiving the shaft 19 therethrough.

A collar 51 is secured to the forward end of the shaft 19 by means of a set screw 52, while an internally threaded knob 53 is screwed onto the externally threaded end 54 of the shaft 19, the knob 53 and collar 51 fixedly mounting therebetween a circular dial 55 having a central opening receiving shaft 19.

A pair of adjustable fingers 56 are provided at their inner ends with openings receiving the shaft 19 therethrough, the outer ends of the fingers 56 terminating in bent over, pointed portions 57 secured to the dial 55 by means of set screws 58. It will be noted that by loosening the set screws 58 and knob 53 the fingers 56 may be adjusted angularly upon the dial 55. A mercury switch 59 is mounted on the rear face of each finger 56 by means of a bracket 60. The two open adjacent terminals of each of the mercury switches 59 are connected to one of the terminals 61 of a terminal strip 62 by means of flexible insulated wires 63.

The bottom wall 64 of the explosion-proof housing 44 is provided with an opening 65 adjacent the strip 62 and through which downwardly pass the insulated wires 66 from terminals 61. Preferably the undersurface of wall 64 surrounding opening 65 will be provided with a downwardly extending hub 67, internally threaded and receiving the externally threaded upper end of a pipe 68 within which the wires 66 are housed.

An elongated shaft 69 having an enlarged inner end is provided with an opening receiving the shaft 19 and is fixedly secured thereon by means of a set screw 70 (Fig. 5), the outer or free end of the shaft 69 being provided with a weight 71 adjustable therealong by means of a set screw 72.

The front wall 73 of explosion-proof casing 44 is provided with a circular outwardly flanged opening 74 internally threaded and in which is screwed an externally threaded circular plug 75, permitting access to the dial 55 and switches 59 when desired, for example when adjusting the fingers 56.

An indicating finger 76 is secured to the top wall 46 by means of a screw 77 and cooperates with a suitably calibrated scale 78 provided on the dial 55.

As shown in Fig. 6, the vertical pipe 10 is connected to the horizontal pipe 79 by means of a T 80 while the vertical pipe 11 is connected to a horizontal pipe 81 by means of a T 82. A horizontal pipe 83 is connected to the T 80, while a horizontal pipe 84 is connected to the T 82, the adjacent ends of pipes 83 and 84 being connected by a gate valve 85. Upon closing the gate valve 85, the fluid coursing through pipe 79 in the direction of the arrow of Fig. 6 will flow upwardly through vertical pipe 10 and horizontal pipe 14 through the T 16.

When a liquid, vapor or gas flows through the T 16, the flapper 24 will assume an upwardly displaced position, the displacement being proportional to the rate of flow. The shaft 19, which is locked to the arm 22 and flapper 24 by means of the set screw 23, will rotate upwardly to a corresponding position, carrying with it the dial 55. This rotation of dial 55 in a counterclockwise direction rotates the fingers 56 and the mercury switches 59 from the zero position of Fig. 1 to a new position in which the ends of the switches 59 provided with the adjacent terminals will be disposed lowermost, permitting the mercury to establish contact between these terminals whereby to close the switches.

The rotation of shaft 19 in the aforesaid manner will also rotate the shaft 69 carrying the adjustable weight 71, as will be obvious.

I have found that with a fixed position of the adjustable weight 71 on the shaft 69, the position of the flapper 24 during flow through the T 16 will be determined by the rate of flow of the liquid, vapor or gas.

The device thus makes possible the control of electrical equipment by means of the switches 59, this control depending upon the rate of flow. The device also provides an indicating means for determining the rate of flow, since the displacement of the scale 78 relative to the pointer 76 will be proportional to the rate of flow. The scale 78 may be calibrated in any suitable manner and units, to indicate this rate of flow.

The dial 55 may be calibrated in degrees of a circle or with other graduations adapted to indicate directly the rate of flow, as will be apparent to those skilled in the art. The cover 75 will, of course, be provided with a suitable window, not shown, to provide visual access to dial 55.

Referring now particularly to Fig. 7, the device is shown mounted directly on the horizontal pipes 79 and 81 in the path of flow of a liquid therethrough, thus illustrating the direct application of the device to a pipe or vessel, as contrasted with the by-pass connection of Fig. 6 (in which latter case the gate valve 85 or an orifice plate, not shown, was utilized to divert the flow through the T 16).

Referring now particularly to Fig. 5, there is shown an optional addition for adjustable time delay control. The plunger rod 86 is pivotally connected at its upper end to the outer end of the rod 69 by means of a pin 87, while the lower end of the rod 86 is secured to a plunger 88. The plunger 88 moves within the vertical cylinder 89, the cylinder 89 at the bottom thereof at one side being provided with a needle valve 90 permitting the escape of air through outlet 91 to be adjusted in an obvious manner. Air 92 is supplied through an inlet opening in the bottom of cylinder 89 through a one-way valve 93 adapted to permit the entry of air in the direction of the arrow of Fig. 5, but preventing its escape therethrough in the opposite direction. Thus, when the flapper 24 no longer retains the rod 69 and the weight 71 in the position of Fig. 5, the downward movement of these members will be retarded by the cylinder 89 containing the air 92 and the downwardly moving plunger 88, since the downward movement of the plunger will be controlled by the amount of air escaping through the outlet 91. This latter escape can, of course, be readily controlled so as to permit a predetermined time delay to be brought into effect before the flapper returns to the zero position. This permits the electrical device actuated by the present invention to continue to function for any predetermined time after flow has ceased past the flapper 24.

It will be apparent to those skilled in the art that the above control device may be applied to a standard check valve with an extension shaft, the mounting brackets being then applied directly to the check valve mounting bolts.

It will also be readily apparent that the device may, of course, be used without the adjustable fingers 56 and the mercury switches 59, in which case it would function as an indicator of the rate of flow through the pipes and T 16.

I have described what I believe to be the best embodiments of my invention. I do not wish, however, to be confined to the embodiments shown, but what I desire to cover by Letters Patent is set forth in the appended claims.

What is claimed is:

1. An automatic flow control device comprising flapper means disposed in the path of flow of a fluid, a shaft secured to said flapper means, a rotating dial secured to said shaft, electric switch means carried by said dial and adapted to be opened and closed upon rotation thereof, and means for mounting said electric switch means on said dial in a plurality of positions, said means including an elongated strip disposed across one face of said dial, the inner end of said strip surrounding said shaft, the outer end of said strip being bent back across the outer face of said dial, and means for tightening said bent back portion and strip against the dial whereby to fix the position of said strip angularly on said dial.

2. An automatic flow control device according to claim 1, said electrical switch means including a plurality of mercury switches.

3. An automatic flow control device according to claim 1, said flapper means including a housing connecting the ends of pipe through which the fluid flows, said shaft being rotatably mounted within said housing, a moving arm secured to said shaft within said housing and extending into the path of flow of the fluid, and a plate carried at the end of said moving arm remote from said shaft and adapted to obstruct the path of flow of the fluid.

4. An automatic flow control device according to claim 3, including a packing gland in the side of said housing, said shaft extending outwardly through said packing gland.

5. An automatic flow control device according to claim 1, including an explosion-proof housing for said dial and switches, said shaft passing inwardly through an opening provided in the rear wall of said explosion-proof housing, and a removable cover provided at the front of said explosion-proof housing whereby to provide access to said dial and switches.

6. An automatic flow control device according to claim 5, including an explosion-proof gland secured to the rear wall of said explosion-proof housing surrounding said opening, said shaft passing through said explosion-proof gland.

7. An automatic flow control device according to claim 5, including a terminal strip mounted within said explosion-proof housing, said mercury switches being connected to the terminals of said strip by means of flexible wiring.

8. An automatic flow control device according to claim 5, including a collar adjustably secured to said shaft within said explosion-proof housing, said dial having an opening receiving said shaft therethrough and abutting with the outer end of said collar, the outer end of said shaft being externally threaded, and an internally threaded knob screwed onto the end of said shaft having a flat end portion in tensional engagement with the other face of said dial.

9. An automatic flow control device according to claim 1, including a second shaft connected to said first shaft at substantially right angles thereto, and a weight adjustable along said second shaft.

10. An automatic flow control device according to claim 9, including a substantially vertical cylinder disposed below the outer end of said second shaft, a plunger within said cylinder, the upper end of said cylinder being open and receiving therethrough a connecting rod secured at one end to said plunger and pivotally connected at the other end to the outer end of said second shaft, air disposed within said cylinder in the path of said plunger, a needle valve and an outlet at the bottom of said cylinder whereby to adjust the escape of air from said cylinder, and a one way valve adapted to permit entry of air into said cylinder below said plunger.

References Cited in the file of this patent

UNITED STATES PATENTS

| | | |
|---|---|---|
| 529,191 | Recknagel | Nov. 13, 1894 |
| 1,020,037 | French | Mar. 12, 1912 |
| 2,024,571 | Gent | Dec. 17, 1935 |
| 2,203,331 | Hinsch | June 4, 1940 |